United States Patent [19]
Jayawant

[11] 3,890,428
[45] June 17, 1975

[54] DECOLORIZATION OF AMMONIUM THIOSULFATE

[75] Inventor: Madhusudan D. Jayawant, Hockessin, Del.

[73] Assignee: E. I. du Pont de Nemours & Company, Wilmington, Del.

[22] Filed: Sept. 6, 1973

[21] Appl. No.: 394,821

[52] U.S. Cl. ................................. 423/264; 423/514
[51] Int. Cl. ............................................. C01b 17/64
[58] Field of Search ........... 423/514, 264, 265, 275, 423/271

[56] References Cited
UNITED STATES PATENTS

| | | | |
|---|---|---|---|
| 2,412,607 | 12/1946 | Farr et al. | 423/514 |
| 3,473,891 | 10/1969 | Mack | 423/514 |

Primary Examiner—Earl C. Thomas

[57] ABSTRACT

During the manufacture of ammonium thiosulfate solutions various coloring agents can create a quality problem. These agents can be removed by adding 5 to 1000 ppm of $SiO_2$ as aqueous sodium, lithium or potassium silicate to the solution and separating the coloring agents which precipitate as insoluble solids.

6 Claims, No Drawings

DECOLORIZATION OF AMMONIUM THIOSULFATE

BACKGROUND OF THE INVENTION

Ammonium thiosulfate, $(NH_4)_2S_2O_3$, has long been used by the photographic industry as a fixing agent. Normally the ammonium thiosulfate is shipped and sold in the form of a 55 to 62 percent solution since such solutions are stable and easily mixed with other ingredients to form a photographic fixing bath.

Solutions of ammonium thiosulfate, however, tend to be off-colored because of the presence of impurities from raw materials, equipment, side reactions, and the like. These impurities are mainly iron compounds, e.g., colloidal hydrated ferric oxides, and sulfides and polysulfide anions.

It has been proposed to decolorize aqueous ammonium thiosulfate solution by treatment with ammonium bisulfite, U.S. Pat. No. 3,473,891 or activated carbon, British Pat. No. 1,175,069.

SUMMARY OF THE INVENTION

I have discovered that aqueous solutions of ammonium thiosulfate can be decolorized by the addition of a decolorizing amount, i.e., 5 to 1000 ppm, preferably 10 to 100 ppm, of $SiO_2$ as aqueous sodium, potassium or lithium silicate, preferably sodium silicate. The silicate precipitates the coloring agents present as insoluble solids and these solids can be separated from the solution by any liquid/solid separation technique, e.g., by filtration, centrifugation, etc.

The treated ammonium thiosulfate solution is then a water clear solution and a useful product of commerce. If desired, crystallized ammonium thiosulfate can be prepared by evaporation from the solutions treated by the process of the invention.

DESCRIPTION OF THE INVENTION

Ammonium thiosulfate solutions can be prepared by several processes. The decolorization process of the invention can be used in conjunction with any of these processes wherein coloring agents, e.g., iron compounds, create a problem.

The process of the invention is particularly applicable to a process where solutions, e.g., 40 to 65 percent of ammonium thiosulfate are prepared by adding ammonium bisulfite-ammonium sulfite solution and anhydrous ammonia into an agitated heel of ammonium thiosulfate and sulfur in a reactor. This reaction creates a crude ammonium thiosulfate product which can then be treated by the process of the invention to remove color.

This color removal can be accomplished in conjunction with decolorization by use of activated carbon. Activated carbon is commonly used to remove most of the color bodies present in ammonium thiosulfate solutions; however, it has been found that the activated carbon will not necessarily remove all the coloring agents present. Thus, if the solution is also subjected to the silicate treatment, the coloring agents not susceptible to activated carbon decolorization will also be removed.

The crude ammonium thiosulfate solutions can have a rating of 30 to 100 or more on the APHA color scale. The APHA color standards are described in "Standard Methods For The Examination of Water and Sewage," American Public Health Association, 10th Ed., page 87 and ASTM Standard D 1209–69. After treatment with the silicate, precipitation and removal of the coloring agent, the color can be reduced to 3 to 5 APHA.

Aqueous silicate solutions of any conventional concentration can be used in the process of the invention. The useful silicates can have various silica to metal oxide molar ratios; thus the alkali metal silicates, e.g., sodium, potassium amd lithium silicates, can have molar ratios of 1:1 to 3.75:1 of $SiO_2:M_2O$ where M is the metal ion. As previously set forth, the use of aqueous sodium silicate is preferred and any of the commercially available sodium silicate solutions can be employed.

Sufficient silicate should be added to the ammonium thiosulfate solution to remove all the coloring agents present. For example, it is desirable to reduce the iron content of the ammonium thiosulfate solution to less than 1 ppm. The amount of silicate to be added will, of course, vary for different crude solutions depending upon many factors. Generally, the amount of silicate as $SiO_2$ should be between 5 and 1000 ppm, preferably in the range of 10 to 100 ppm.

The temperature at which the silicate solution is added to the ammonium thiosulfate solution is not critical. It can be ambient or at the temperature of the solution as it leaves the reactor, e.g., about 90°C.

The sodium silicate solution can be added batchwise or continuously to the ammonium thiosulfate solution. The use of agitation is preferred; however, it is not necessary. In many instances the sodium silicate solution can be added to the reactor at the completion of a batch of crude. The rate of addition is not critical, and the silicate can be added all at once or over a period of time. It the silicate treatment is employed in conjunction with an activated carbon treatment, the silicate can be added either before or after the carbon treatment.

The silicate is effective is precipitating the coloring agent present in the crude solution of ammonium thiosulfate, usually within 5 to 120 minutes.

The precipitated coloring agents are insoluble and can be separated from the ammonium thiosulfate by any conventional liquid/solid separation technique. Filtration is the simplest and thus preferred method of making this separation.

If desired, the separation of the insoluble silicious precipitates can be speeded up by the use of conventional flocculating agents, e.g., polyacrylamide 105-C sold by Atlas Chemical Company. Other cationic polyelectrolytes, such as polyethyleneimines, polyquarternary ammonium compounds, copolymers of hydroxyethylacrylate and dimethylaminoethylacrylate, etc. can also be employed.

As previously mentioned, after filtration the ammonium thiosulfate solution can be treated with activated carbon to remove other impurities present.

I have also discovered that sodium tripolyphosphate ($Na_5P_3O_{10}$) can be added with or without the silicates to decolorize crude ammonium thiosulfate solutions.

The process of the invention will now be illustrated by the following exemplary embodiment.

EXAMPLE

A crude 60 percent solution of ammonium thiosulfate having a dark yellow-brown color was placed in a beaker. To the solution was added dropwise with stirring 619 ppm of $SiO_2$ as sodium silicate solution. The ammonium thiosulfate solution was left stirring for 2 hours at room temperature. At the end of this period the solution was filtered and the filtrate was water clear. All of the yellow-brown color came out with the gelatinous floc which was retained on the filter paper.

When air was bubbled through the clear solution for 36 hours, there was no development of the undesired yellow-brown color. When air was bubbled through a pale yellow solution of ammonium thiosulfate treated only with activated carbon, there was the development of an intense yellow color.

Lithium or potassium silicate could be employed in lieu of sodium silicate and similar results can be obtained.

I claim:

1. A method for removing coloring agents selected from the group consisting of iron compounds, sulfide ions and polysulfide ions from aqueous ammonium thiosulfate solutions comprising (a) adding to such solution a decolorizing amount of $SiO_2$ as aqueous sodium, potassium or lithium silicate to precipitate such coloring agents and (b) separating the precipitated coloring agents from the aqueous solutions.

2. The process of claim 1 wherein 5 to 1000 ppm of $SiO_2$ as aqueous sodium, potassium or lithium silicate is added.

3. The process of claim 2 wherein the silicate is sodium silicate.

4. The process of claim 2 wherein 10 to 100 ppm is added.

5. The process of claim 3 wherein 10 to 100 ppm is added.

6. The process of claim 2 wherein the coloring agent is separated by filtration.

* * * * *